D. SCHOENING.
FLEXIBLE SHAFTING.
APPLICATION FILED DEC. 22, 1908.

956,737.

Patented May 3, 1910.

Witnesses:
W. R. Schulz
Edward Schorr.

Inventor:
Daniel Schoening
by his attorney

UNITED STATES PATENT OFFICE.

DANIEL SCHOENING, OF BERGEDORF, GERMANY.

FLEXIBLE SHAFTING.

956,737.  Specification of Letters Patent.  Patented May 3, 1910.

Application filed December 22, 1908. Serial No. 468,704.

*To all whom it may concern:*

Be it known that I, DANIEL SCHOENING, a subject of the German Emperor, and resident of Bergedorf, Germany, have invented certain new and useful Improvements in Flexible Shafting, of which the following is a specification.

The invention relates to flexible shafting composed of a plurality of separate members, and its object is to provide a light shafting of this type which shall be cheaper to manufacture and also prevent loss of driving power as far as can be practically attained.

Ordinary flexible shaftings are heavy and are subject to considerable loss of power owing to their weight, while the manufacture of the same is beset with difficulties and is comparatively expensive.

According to this invention the flexible shafting is composed of tubular members adapted to be secured together practically without any separate connecting means. Flexible shafting made i nthis manner is comparatively light and can be easily and cheaply manufactured.

The accompanying drawings show two forms of slightly different constructions, by way of example.

Figure 1:
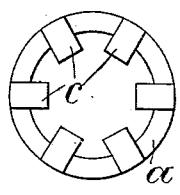
Figure 2:
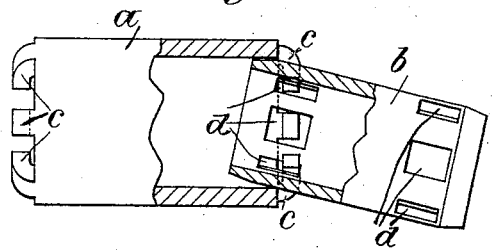
Figure 3:
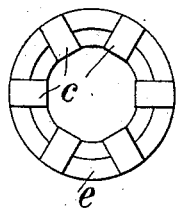
Figure 4:
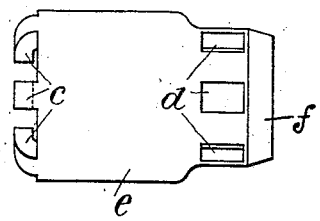
Figure 5:
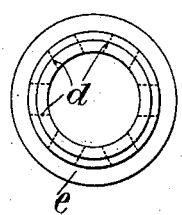

Figures 1 and 2 are an end-view and a side-view partly shown in section, of one form of the flexible shafting. Figs. 3, 4 and 5 are a front view, a side-view and a rear-view respectively of a modified form.

Referring first to Figs. 1 and 2, the flexible shafting comprises short tubular members $a$ and $b$ having telescoping ends. The members $a$ have at each end a number of spaced integral teeth, claws $c$ or the like produced in any convenient manner. For example, they may be cut in the ends of a straight tube or barrel and then be bent inward to the form shown. The tubular members $b$ are provided at their telescoped ends with a corresponding number of set back spaced apertures $d$. In this way each member $b$ is made with an integral continuous rim $f$ that forms a longitudinal prolongation of such member, and is beveled at its outer face. Apertures $d$ extend at right angles to the axis of member $b$ and are engaged by the claws $c$ so that the members $a$, $b$ of the flexible shafting act upon one another to revolve while at the same time allowing for bends in such shafting. Further facility for bending is provided by a chamfered edge formed at each end of the members $b$.

The modified form of construction shown at Figs. 3 to 5 requires only a single type of members $e$ having a large portion with front teeth or claws $c$ and reduced portion in which are formed eyes or holes $d$ and ending with a chamfered edge, the holes $d$ serving to engage the teeth or claws $c$ of the succeeding member $e$.

What I claim is:

A flexible shafting comprising a first tubular member, having a series of spaced inwardly extending claws, and a second tubular member telescoped by the first member and having a series of apertures engaged by the claws and extending at right angles to the axis of said second member, and a beveled integral rim that forms a longitudinal prolongation of said member.

Signed by me at Hamburg, Germany this 4th day of December 1908.

DANIEL SCHOENING.

Witnesses:
AUGUST WENK,
ERNEST H. L. MUMMENHOFF.